(12) United States Patent
Boldo

(10) Patent No.: US 7,345,893 B2
(45) Date of Patent: Mar. 18, 2008

(54) BOOST CONVERTER WITH MAGNETICALLY COUPLED AND UNCOUPLED INDUCTORS

(75) Inventor: Pablo Rueda Boldo, LT Katwijk (NL)

(73) Assignee: Agence Spatiale Europeenne (FR)

( * ) Notice: Subject to any disclaimer, the term of this patent is extended or adjusted under 35 U.S.C. 154(b) by 302 days.

(21) Appl. No.: 11/036,823

(22) Filed: Jan. 14, 2005

(65) Prior Publication Data
US 2005/0157523 A1    Jul. 21, 2005

(30) Foreign Application Priority Data
Jan. 16, 2004   (FR)   ................... 04 00419

(51) Int. Cl.
*H02M 3/335* (2006.01)
(52) U.S. Cl. ............ 363/16; 363/21.13; 323/222
(58) Field of Classification Search .......... 323/222, 323/283, 355, 356; 363/16–20, 40, 21.1, 363/21.13
See application file for complete search history.

(56) References Cited

U.S. PATENT DOCUMENTS

| | | | |
|---|---|---|---|
| 4,459,537 A | | 7/1984 | McWhorter |
| 4,970,451 A | * | 11/1990 | Suomalainen ............... 323/222 |
| 5,929,614 A | * | 7/1999 | Copple ........................ 323/222 |
| 6,177,736 B1 | * | 1/2001 | Raiser .......................... 307/17 |
| 6,400,579 B2 | | 6/2002 | Cuk |

FOREIGN PATENT DOCUMENTS

| | | |
|---|---|---|
| DE | 33 22 461 | 1/1985 |
| JP | 05130768 | 5/1993 |
| JP | 2001218452 | 8/2001 |

* cited by examiner

*Primary Examiner*—Rajnikant B. Patel
(74) *Attorney, Agent, or Firm*—Fish & Richardson P.C.

(57) ABSTRACT

A switching type converter including an input stage and an output stage, the input stage including an input inductor to which an input DC voltage to be regulated is applied, switching component for directing the current passing through the input inductor either to the ground or to the output stage, and a capacitor mounted in parallel between the output from the switching component and the ground, the output stage including an output inductor mounted in series, an output capacitor mounted in parallel, the terminals of which carry the output voltage from the regulator, and an additional inductor connecting the output of the switching component to the output stage and magnetically coupled to the input inductor.

5 Claims, 3 Drawing Sheets

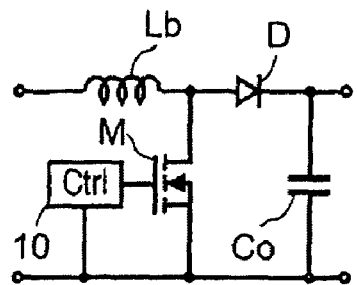
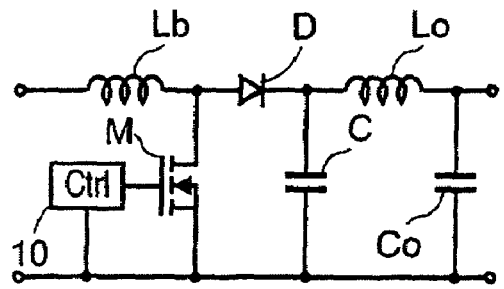
Fig. 1 (Prior Art)   Fig. 2 (Prior Art)
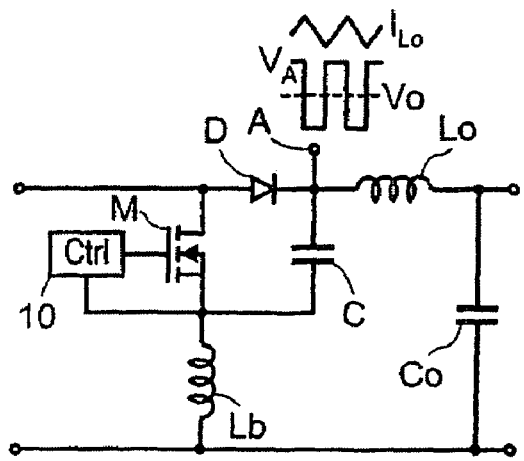
Fig. 3 (Prior Art)
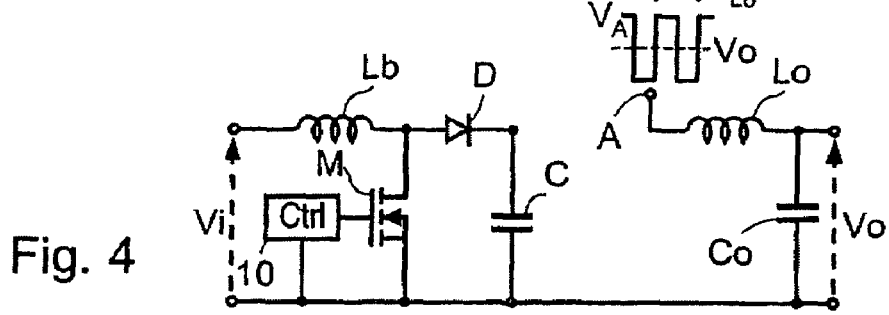
Fig. 4
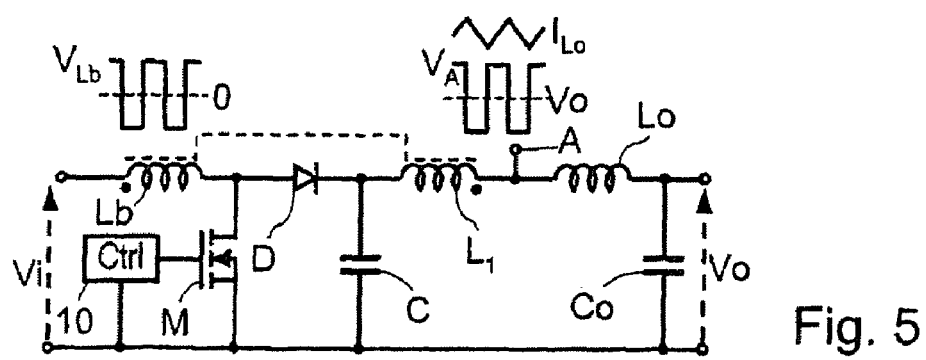
Fig. 5

BOOST CONVERTER WITH MAGNETICALLY COUPLED AND UNCOUPLED INDUCTORS

BACKGROUND OF THE INVENTION

1. Field of the Invention

The present invention relates to switching or DC-DC type converters. It is particularly but not exclusively applicable to the power supply for onboard systems, for example on spacecraft.

2. Description of the Prior Art

Switch-mode converters have the advantage of being compact while having a very high power conversion efficiency, which is particularly useful for onboard systems. They are frequently used in applications requiring a well regulated voltage, even when the voltage source is variable.

In some cases, the required voltage is greater than the source voltage. In this case a boost converter is used. FIG. 1 shows the block diagram for such a converter. This converter comprises a switching device M, for example an N-channel MOSFET (Metal-Oxide Semiconductor Field Effect Transistor) type device mounted in parallel, powered by a current source composed of the voltage source to be regulated connected in series to an inductor Lb, and the gate of which is connected to a control circuit 10 also connected to the transistor source, in other words the ground. The terminals of the switching device M are connected to a forward-mounted diode D mounted in series with a filter capacitor Co, the load to be powered being connected to the capacitor terminals.

The "conductance control" is a control mode currently used to control the switching device. This control mode is described particularly in the "PWM Conductance Control" document by D. O'Sullivan, H. Spruyt & A. Crausaz, IEEE PESC, 1988.

Although this boost converter is very simple and efficient, it has dynamic performance limitations due its transfer function with zeros in the complex right half plane and because it produces a pulsed output current. The result is that it is not frequently used in electrical power supplies installed on spacecraft.

In an attempt to find a solution to this problem, a filter stage was added to the output from the converter, as shown in FIG. 2. This filter stage comprises a capacitor C mounted in parallel with the diode D and the switching device M, and an inductor Lo arranged between the two capacitors C and Co. This filter stage reduces the noise present in the output current, but it does not improve the dynamic performances of the converter.

At the end of the 1980s, it was proposed to overcome this problem by integrating a capacitive energy transfer device into this converter. This type of converter, also known as two-inductor boost converter, is shown in FIG. 3. The converter shown in this Figure is different from the converter shown in FIG. 2 in that the inductor Lb is connected by being inserted between the junction point between the switching device M and the capacitor, and the ground path, rather than being connected to the converter input. In this converter, the capacitor C may be considered as a voltage source. As soon as the switching device M starts conducting, there is an immediate power transfer to the output of the circuit. This avoids effects resulting from the presence of right half plane (RHP) zeros in conventional boost converters.

In fact, the capacitor C partially discharges when the switching device is conducting, which leads to a transfer of energy to the output. The capacitor C is recharged while the switching device is open.

When the behavior of this circuit is analyzed precisely, it can be observed that its transfer function has a double pole and a double zero. Double poles and double zeros can easily be eliminated by appropriate selection of circuit components and appropriate damping, so as to obtain performances of a stable first order system. Thus, this converter is frequently used in battery discharge regulation circuits.

However, this converter has the disadvantage that it requires a floating control 10 (not connected to the ground) since the switching device M formed by a MOFSET transistor is not close to the ground path due to the presence of inductor Lb. Furthermore, since the floating terminal (connected to the inductor Lb) of the transistor alternately passes between positive and negative voltages during nominal operation of the converter, the floating control cannot be achieved simply using an existing integrated circuit since there is no integrated control circuit that resists negative voltages.

SUMMARY OF THE INVENTION

The purpose of this invention is to eliminate these disadvantages, by providing a converter having the advantages of a two-inductor boost converter (shown in FIG. 3), which relate to the presence of right half plane zeros and continuity of the output current, and the advantages of the converter shown in FIGS. 1 and 2 concerning the fact that one of the terminals of the switching device is close to the ground, so that a simple control circuit can be used.

This objective is achieved by providing a switching type converter comprising an input stage and an output stage comprising an output inductor mounted in series and an output capacitor mounted in parallel, the input stage comprising an input inductor into which an input DC voltage to be regulated is input, switching means for directing the current passing through the input inductor either to the ground or to the output stage, and a capacitor mounted in parallel between the output from the switching means and the ground, the converter outputting an output voltage to the terminals of the output capacitor.

According to the invention, the output stage comprises a first additional inductor connecting the output of the switching means to the output stage and magnetically coupled to the input inductor.

According to one preferred embodiment of the invention, the switching means comprise a transistor mounted in parallel between the output terminal of the input inductor and the ground, and a forward-mounted diode connected to the first additional inductor and to the capacitor.

This transistor is advantageously a MOSFET type transistor.

According to another preferred embodiment of the invention, the diode is connected to the transistor and to the output of the input inductor.

According to yet another preferred embodiment of the invention, the input stage comprises a second additional inductor magnetically coupled to the input inductor and to the first additional inductor and connected between the direct terminal of the diode and the ground.

The invention will be more clearly understood and other features and advantages of the invention will emerge from a reading of the following description given with reference to the appended drawings.

BRIEF DESCRIPTION OF THE DRAWINGS

FIGS. 1 to 3 show switch-mode boost converters according to prior art;

FIG. 4 shows a block diagram of a switching boost converter according to the invention;

FIG. 5 shows an embodiment of the converter shown in FIG. 4;

DETAILED DESCRIPTION OF THE PREFERRED EMBODIMENT

Figure 6:
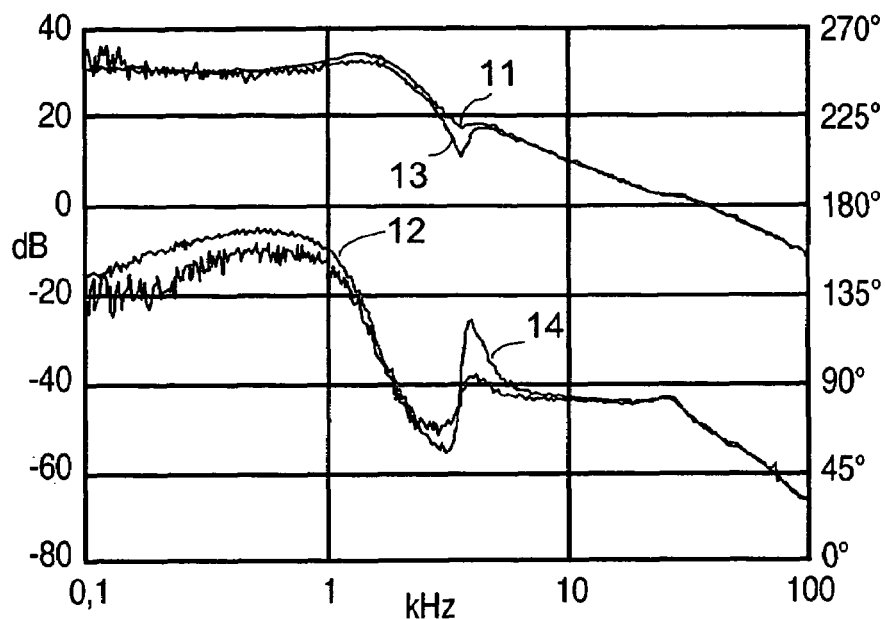
FIGS. 6 to 8 show curves illustrating the stability performances of the converter shown in FIG. 5.

The major characteristics of the invention will now be detailed. FIG. 4 shows the block diagram of a switching boost converter according to the invention.

In this Figure, the converter includes an input stage and an output stage, the input stage comprising an input inductor Lb to which the input voltage to be regulated is applied, a forward-mounted diode D mounted in parallel with the inductor Lb, a switching device M, for example an N-channel MOSFET transistor type mounted in parallel between the junction point between the inductor and the diode, and a ground path, and a capacitor C connected to the inverting terminal of the diode and the ground path. The gate of the transistor M is connected to a control circuit 10 also connected to the transistor source, itself connected to the ground. The output stage includes an output inductor Lo connected between a point A and an output terminal of the converter, and an output capacitor Co connected to the output terminal and the ground.

The purpose of the invention, starting from the input stage, is to obtain a square signal at point A with an amplitude equal to the required DC output voltage Vo, and a current in the output inductor Lo with an intensity in the shape of a saw tooth signal conforming with what is obtained using the two-inductor converter shown in FIG. 3, but with a switching device M connected to the ground.

The assembly formed by the switching device M and the diode D behaves like a switch applying the current output by the current source consisting of the input inductor Lb coupled to the voltage source to be regulated, either directly to the ground path when the switching device is conducting, diode D then being non-conducting, or to the output stage through the diode which is then conducting while the switching device is open.

The result is that capacitor C charges when the switching device is in the open state, and the capacitor C discharges in the output stage when the switching device is in the closed state. When the switching device is in the closed state, the capacitor C may be considered like a voltage source, instantaneously transferring the stored energy to the output stage when the switching device is in the open state.

As in prior art, the output voltage Vo from this boost converter is equal to Vi/(1−d), where Vi is the input voltage and d is the cyclic ratio of the control signal applied to the switching device. The average voltage applied to the input inductor Lb is zero. Consequently, any inductor magnetically coupled to this input inductor will also have a zero average voltage. If an auxiliary inductor is magnetically coupled to the inductor Lb, and connected to the output capacitor Co, thus applying a negative voltage to the output capacitor while the switching device is conducting, it is possible to generate a voltage at point A greater than the output voltage Vo while the switching device is conducting. The result is that the voltage at point A while the switching device is open becomes less than the output voltage Vo, as in the circuit shown in FIG. 3.

FIG. 5 shows an example of a converter based on the principle shown in FIG. 4. The converter shown in this Figure is identical to the converter in FIG. 4, except that the junction point between the diode D and the capacitor C is connected to point A through an auxiliary inductor $L_1$ magnetically coupled to the input inductor Lb. In this way, a direct transfer channel is formed towards the converter output when the switching device is conducting, which avoids non-minimum phase characteristics, in other words eliminating right half plane (RHP) zeros.

The energy transfer made by the transformer composed of the magnetically coupled inductors Lb and $L_1$ provides a good flexibility in terms of ratio of the number of windings in inductors Lb and $L_1$, which is not the case for capacitive coupling. In this way, the average of the amplitude of the square signal generated at point A is always equal to the output voltage Vo.

In fact, the ratio of the number of windings in inductors Lb and $L_1$ modifies the location of the zeros and poles of the transfer function and the energy quantity stored in the inductor Lb. It is also easy to demonstrate that the continuous transfer function of the converter according to the invention is identical to the transfer function of the converter according to prior art shown in FIG. 3, if the ratio of the number of windings in coupling inductors Lb and $L_1$ is not taken into account.

The energy transfer principle according to the invention may be applied to other types of sources. For example, if a current source is placed at the input, the converter according to the invention may also perform voltage regulation. Furthermore, in this case the converter is capable of restoring practically all power from the source with control electronics 10 being significantly simplified due to the fact that the switching device M composed of a MOSFET transistor is close to the ground.

Tests have also demonstrated that the converter according to the invention may be used as a voltage controlled current source without having the disadvantages caused by the presence of right half plane zeros. Furthermore, the converter according to the invention with a ratio of number of windings equal to 1:1 has very similar low current characteristics to those of the converter in FIG. 3, when it is used as a voltage controlled current source, due to the fact firstly that voltages applied to the output inductor are similar, but also due to the energy stored in the inductors and their current ripples.

It is well known that the transfer function of the two-inductor boost converter shown in FIG. 3 behaves as follows at high frequencies of the output current $i_o$:

$$\left.\frac{i_O}{d}\right|_{s\to\infty} = \frac{V_O}{L_O s} \quad (1)$$

Thus, it would be expected that the behavior of the two-inductor converter and of the converter according to the invention at high frequencies in open loop would be as follows:

$$\left.A_{OL<C>}\right|_{s\to\infty} = \frac{V_O}{V_S} \cdot \frac{A_C \cdot R_S}{L_O \cdot s} \quad (2)$$

in which:

$V_S$ is the amplitude of the compensation gradient (saw tooth shape), $A_C$ is the current amplification gain and $R_s$ is the gain of the current detector (in Volts/Amperes). Thus, at high frequencies in open loop, these converters behave like a first order system, close to their frequency band, if the load and input voltage Vi are not taken into account.

Figure 7:
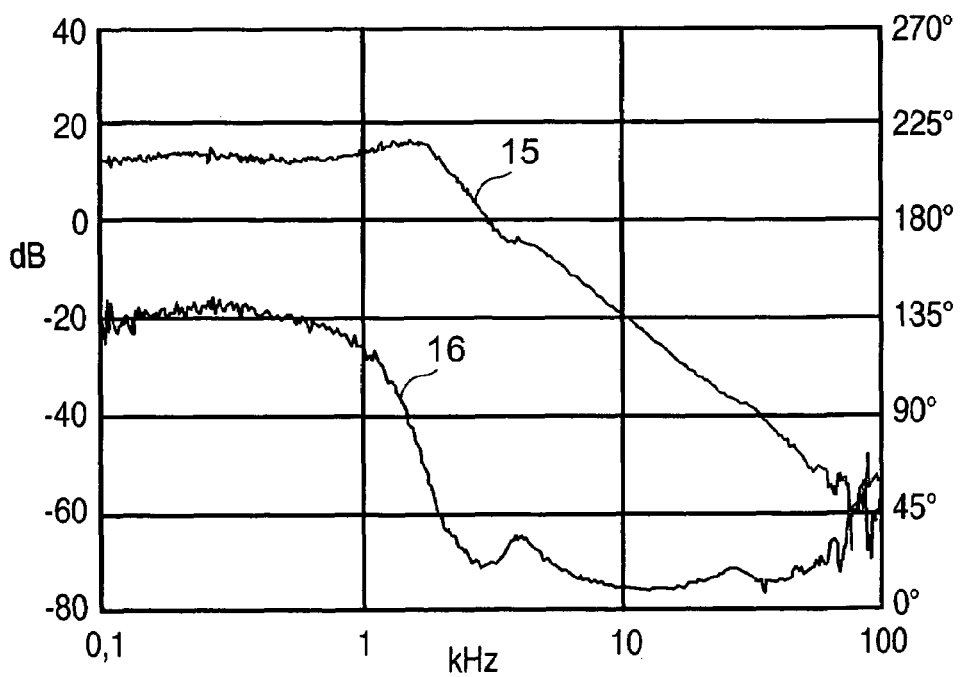
Figure 8:
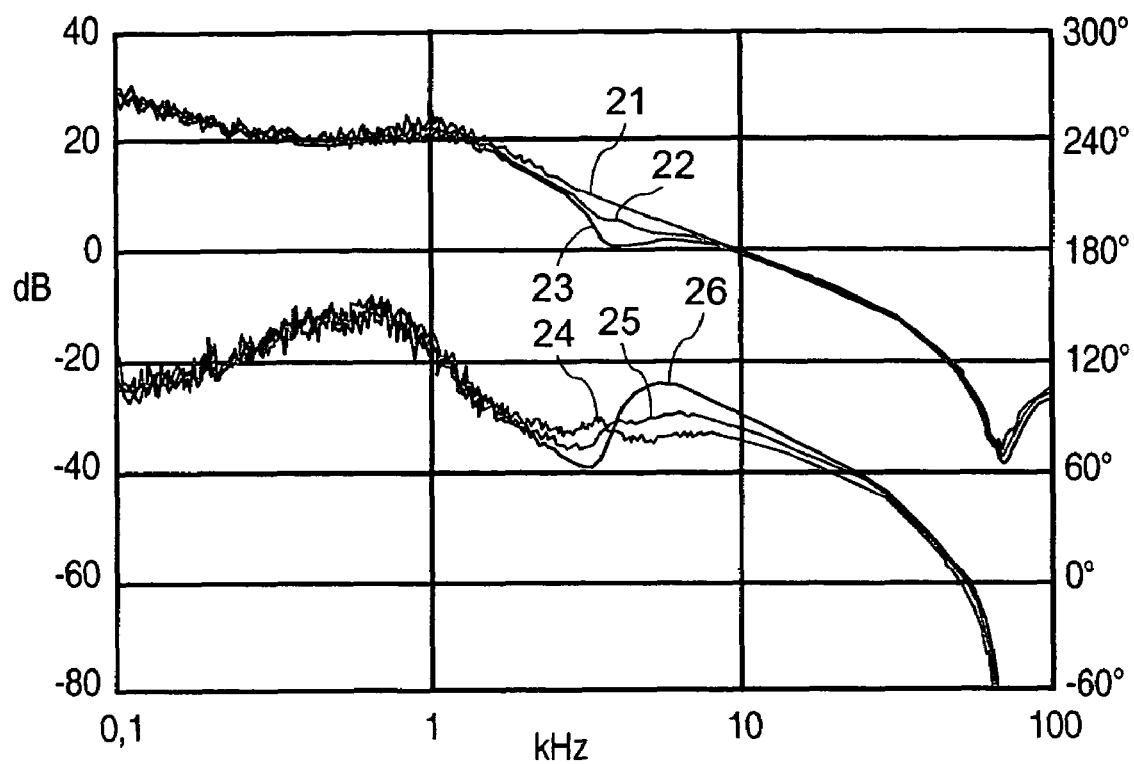

FIGS. 6 to 8 illustrate the stability performances of a 300 W prototype made according to the principle of the converter according to the invention, with the following component values:

C=44 µF, Co=275 µF, Lb=30 µH and Lo=22 µH.

This prototype is capable of outputting a regulated voltage of 28 Volts starting from a voltage source varying between 15 and 25 Volts.

Curves 11 and 12 in FIG. 6 show respectively the amplitude and phase variations of the open loop converter transfer function as a function of the frequency, particularly the current loop transfer function when the converter is connected to a 100 W load. Curves 13 and 14 respectively show amplitude and phase variations of the open loop converter transfer function as a function of the frequency when the converter is connected to a 200 W load.

As can be seen on these curves, when the open loop converter according to the invention is used as a voltage controlled current source, it behaves like a first order system (with an amplitude variation of 20 dB/decade and a phase margin of about 90°) for frequencies exceeding 5 kHz. At frequencies greater than 30 kHz, the effects of the current detector (Hall effect with a pass band of 200 kHz) and the phase shift due to amplification errors start to play a significative role in low intensity signal measurements.

These curves demonstrate that the open loop performances of the converter according to the invention in the band between 5 and 30 kHz are acceptable for use of the converter as a regulated voltage source with the behavior of a first order system. Around 4 kHz, the effects of the two poles and two zeros of the transfer function can be observed. These effects depend on the operating point and selection of damping parameters.

For reasons of simplicity, it may be sometimes preferable to control the converter only by a single voltage loop. Curves 15 and 16 in FIG. 7 show as a function of the frequency the amplitude and phase variations of the output voltage to duty cycle transfer function, for the converter according to the invention controlled by a single voltage loop.

The transfer function shown in this Figure shows that the converter according to the invention corresponds to a conventional second order system with no complex right half plane zero. This type of converter could also be controlled using conventional voltage control techniques.

In FIG. 8, curves 21 to 23 on the one hand, and curves 24 to 26 on the other hand show as a function of the frequency amplitude and phase variations respectively of the open loop transfer function of the converter with a single voltage control loop. Curves 21 and 24 were obtained when the converter was connected to a 100 W load. Curves 22 and 25 were obtained when the converter was connected to a 200 W load, and curves 23 and 26 were obtained when it was connected to a 300 W load.

The ratio of the number of windings in the input inductor Lb and in the auxiliary inductor $L_1$ used in the previous Figures was modified to obtain the curves in FIG. 8. Thus, in the example shown in this Figure, the number of windings in the input inductor Lb is equal to 11, while the number of windings in the auxiliary inductor is equal to 6. Voltage control is achieved by a single slaving loop.

FIG. 8 shows that the converter according to the invention outputs a stable voltage over a 10 kHz frequency band with more than 75° phase margin, for any load power and for different ratios of numbers of windings.

Figure 9:
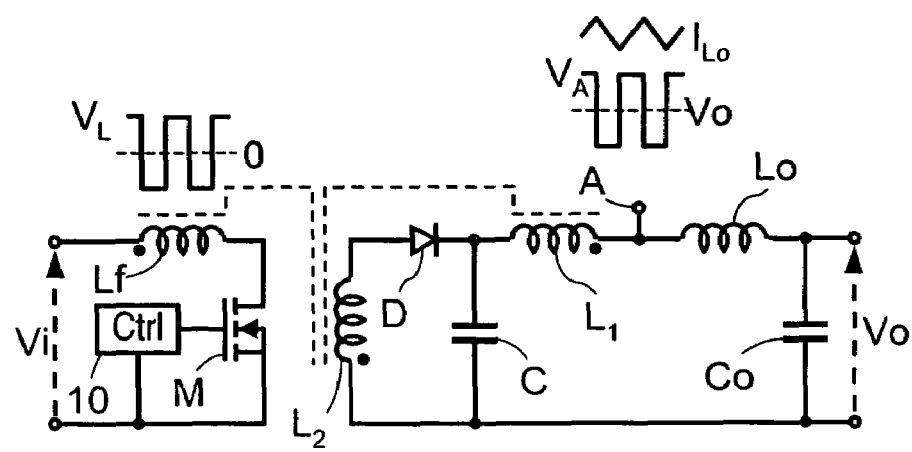
FIG. 9 shows an application of the energy transfer principle used in the converter shown in FIG. 4, to a fly-back type converter.

FIG. 9 shows an application of this invention to a fly-back type converter. This converter is obtained simply by applying the energy transfer principle used in the converter shown in FIG. 5 to a conventional fly-back converter. This is done by replacing the conventional boost voltage stage comprising components Lb, M, D and C by a conventional fly-back stage (Lf, $L_2$, M, D, C).

More precisely, this converter is obtained simply by separating the circuit in FIG. 5 into two circuits at the junction point between diode D and the collector of transistor M and at the ground path connecting the emitter of transistor M with capacitor C, these two circuits being magnetically coupled using an inductor $L_2$ connected on one side to the non-inverting terminal of diode D, and on the other side to the ground path at the capacitor C, this inductor being magnetically coupled both to the input inductor Lf and to the inductor $L_1$.

All the advantages obtained with the converter shown in FIG. 5 are also obtained with the fly-back type converter shown in FIG. 9:

no right half plane zeros effect,
non-pulsed output current,
switch connected to the ground.

The invention claimed is:

1. A switching type converter comprising an input stage and an output stage, the input stage comprising an input inductor to which an input DC voltage to be regulated is applied, switching means for directing the current passing through the input inductor either to the ground or to the output stage, and a capacitor mounted in parallel between the output from the switching means and the ground, the output stage comprising an output inductor mounted in series and an output capacitor mounted in parallel, having terminals carrying the output voltage from the regulator, and a first additional inductor connecting the output of the switching means to the output inductor, the first additional inductor being magnetically coupled to the input inductor and magnetically uncoupled from the output inductor.

2. The converter according to claim 1, wherein the switching means comprise a transistor mounted in parallel between the output terminal of the input inductor and the ground, and a forward-mounted diode connected to the first additional inductor and to the capacitor.

3. The converter according to 2, wherein the transistor is a MOSFET type transistor.

4. The converter according to claim 2, wherein the diode is connected to the transistor and to the output of the input inductor.

5. The converter according to claim 2, wherein the input stage comprises a second additional inductor magnetically coupled to the input inductor and to the first additional inductor and connected to the direct terminal of the diode and to the ground.

* * * * *